(12) United States Patent
Mehta et al.

(10) Patent No.: US 11,756,719 B2
(45) Date of Patent: *Sep. 12, 2023

(54) WIRELESS POWER SYSTEM

(71) Applicant: Apple Inc., Cupertino, CA (US)

(72) Inventors: Narendra S. Mehta, San Carlos, CA (US); Stephen C. Terry, San Jose, CA (US); Rohan Dayal, Daly City, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/484,954

(22) Filed: Sep. 24, 2021

(65) Prior Publication Data

US 2022/0014046 A1    Jan. 13, 2022

Related U.S. Application Data

(63) Continuation of application No. 16/424,331, filed on May 28, 2019, now Pat. No. 11,133,696.

(Continued)

(51) Int. Cl.
| | |
|---|---|
| *H02J 50/10* | (2016.01) |
| *H02J 50/12* | (2016.01) |
| *H01F 27/28* | (2006.01) |
| *H01F 38/14* | (2006.01) |
| *H01M 10/42* | (2006.01) |

(Continued)

(52) U.S. Cl.
CPC ............ *H01F 27/28* (2013.01); *H01F 38/14* (2013.01); *H01M 10/425* (2013.01); *H02J 50/005* (2020.01); *H02J 50/10* (2016.02); *H02J 50/12* (2016.02); *H02J 50/502* (2020.01); *H02J 50/40* (2016.02)

(58) Field of Classification Search
USPC ........................................................ 320/108
See application file for complete search history.

(56) References Cited

U.S. PATENT DOCUMENTS

| | | |
|---|---|---|
| 9,318,915 B2 | 4/2016 | Miller et al. |
| 9,882,419 B2 | 1/2018 | Katabi et al. |

(Continued)

FOREIGN PATENT DOCUMENTS

| | | |
|---|---|---|
| CN | 102377250 A | 3/2012 |
| CN | 103259339 A | 8/2013 |

(Continued)

*Primary Examiner* — Bryce M Aisaka
(74) *Attorney, Agent, or Firm* — TREYZ LAW GROUP; Jason Tsai

(57) ABSTRACT

A battery case has first and second coils on opposing sides of a battery and has switching circuitry that is coupled between the first and second coils. The battery case has a battery that provides supplemental battery power wirelessly to a wireless power receiving device via the second coil when the switching circuitry is in an open state. The case can also receive power wirelessly with the first coil from a wireless charging mat when the switching circuitry is in the open state. In a closed state, the switching circuitry shorts the first and second coils together so that current flowing through the first coil flows through the second coil in series and so that wireless power from the wireless charging mat that is received with the first coil is transmitted wirelessly to the wireless power receiving device using the second coil.

20 Claims, 5 Drawing Sheets

Related U.S. Application Data

(60) Provisional application No. 62/791,587, filed on Jan. 11, 2019.

(51) Int. Cl.
    *H02J 50/00*         (2016.01)
    *H02J 50/50*         (2016.01)
    *H02J 50/40*         (2016.01)

(56) References Cited

U.S. PATENT DOCUMENTS

| | | | |
|---|---|---|---|
| 9,948,134 | B2 | 4/2018 | Wojcik |
| 10,044,229 | B2 | 8/2018 | Partovi et al. |
| 10,277,266 | B1 * | 4/2019 | Nguyen ................ H02J 7/0013 |
| 10,461,581 | B2 | 10/2019 | Klawon et al. |
| 2009/0096413 | A1 | 4/2009 | Partovi et al. |
| 2013/0093388 | A1 | 4/2013 | Partovi |
| 2015/0115723 | A1 | 4/2015 | Levo et al. |
| 2016/0056664 | A1 | 2/2016 | Partovi |
| 2016/0285151 | A1 | 9/2016 | Lee et al. |
| 2016/0336791 | A1 | 11/2016 | Na et al. |
| 2017/0250563 | A1 | 8/2017 | Davison et al. |
| 2017/0271923 | A1 | 9/2017 | Kim et al. |
| 2018/0013307 | A1 | 1/2018 | Pudipeddi |
| 2018/0115184 | A1 * | 4/2018 | Lee ................ H02J 7/0044 |
| 2019/0081499 | A1 | 3/2019 | Sun et al. |

FOREIGN PATENT DOCUMENTS

| | | |
|---|---|---|
| CN | 103280868 A | 9/2013 |
| CN | 204012791 U | 12/2014 |
| CN | 105244929 A | 1/2016 |
| CN | 106564395 A | 4/2017 |
| CN | 106685100 A | 5/2017 |
| CN | 107240961 A | 10/2017 |
| CN | 206619940 U | 11/2017 |
| CN | 107659000 A | 2/2018 |
| CN | 208316420 U | 1/2019 |
| JP | 2001069388 A | 3/2001 |
| JP | 2007116369 A | 5/2007 |
| JP | 2009219330 A | 9/2009 |
| JP | 2012196126 A | 10/2012 |
| JP | 2015061468 A | 3/2015 |
| JP | 3197750 U | 6/2015 |
| JP | 6196861 B2 | 9/2017 |
| KR | 1020120040618 A | 4/2012 |
| KR | 20130039031 A | 4/2013 |
| KR | 101549438 B1 | 9/2015 |

\* cited by examiner

WIRELESS POWER SYSTEM

This application is a continuation of non-provisional patent application Ser. No. 16/424,331, filed May 28, 2019, which claims the benefit of provisional patent application No. 62/791,587, filed Jan. 11, 2019, which are hereby incorporated by reference herein in their entireties.

FIELD

This relates generally to power systems, and, more particularly, to wireless power systems.

BACKGROUND

In a wireless charging system, a wireless charging mat wirelessly transmits power to a portable electronic device that is placed on the mat. The portable electronic device has a coil and rectifier circuitry. The coil receives alternating-current wireless power signals from a coil in the wireless charging mat that is overlapped by the coil in the portable electronic device. The rectifier circuitry converts the received signals into direct-current power.

SUMMARY

A wireless power system has a wireless charging device such as a wireless charging mat or other wireless power transmitting device. Battery-powered electronic devices such as cellular telephones, watches, and accessories are wirelessly charged when placed on a charging surface of the wireless charging mat.

A battery case is provided for a battery-powered electronic device such as a cellular telephone. The battery case is removably attached to the cellular telephone. When the cellular telephone is used for extended periods of time, a battery in the battery case provides supplemental power for the cellular telephone.

The battery case is wirelessly charged when placed on the wireless charging mat. In some configurations, a cellular telephone with an attached battery case is placed on the wireless charging mat. To efficiently charge the cellular telephone from the mat in this situation, the battery case that is attached to the cellular telephone has circuitry that is operable in a bypass mode.

The battery case has first and second coils mounted in a housing. The housing has first and second opposing faces. The first face is formed by a portion of the housing that faces the charging surface. The second face is formed by a portion of the housing that faces the cellular telephone. The battery of the battery case is enclosed within the housing so that the first coil is located between the first face and the battery and so that the second coil is located between the second coil and the battery.

Switching circuitry such as a pair of switches is coupled between the first and second coils. In an open state, the switching circuitry electrically isolates the first and second coils, so that current flowing in one of the coils does not flow through the second coil via the switches. In a closed state, the switching circuitry shorts the first and second coils together. In the closed state, current flowing through the first coil also flows in series through the second coil.

The case can receive power wirelessly with the first coil from the wireless charging mat when the switching circuitry is in the open state. This received power can be used to charge the battery in the case. If desired, the switching circuitry can be placed in the open state to allow wireless power transmitting circuitry in the case to transmit power wirelessly to the cellular telephone using the second coil. In a closed state, the switching circuitry shorts the first and second coils together so that power from the wireless charging mat bypasses the battery and charges the cellular telephone. In the closed state, the first coil receives wireless power signals from the wireless charging mat and a corresponding current is induced in the first coil. This current flows through the second coil, which transmits corresponding wireless power signals to the cellular telephone.

DETAILED DESCRIPTION

Figure 1:
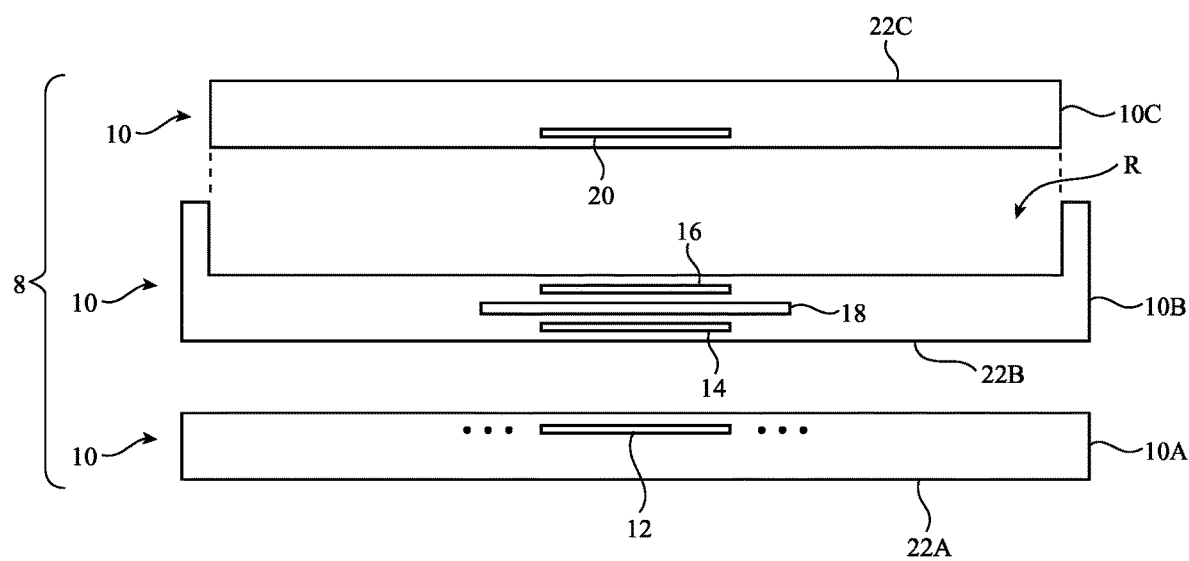
FIG. 1 is a schematic diagram of an illustrative wireless power system in accordance with an embodiment.

A wireless power system includes electronic devices that convey wireless power. An exploded side view of an illustrative wireless power system (wireless charging system) is shown in FIG. 1. As shown in FIG. 1, wireless power system 8 includes electronic devices 10. Each electronic device 10 may include control circuitry and wireless power circuitry. The electronic devices may also have additional components such as input-output devices, batteries, and/or other circuitry.

Devices 10 may be any suitable electronic devices such as power adapters, wristwatches, cellular telephones or other handheld devices, laptop computers, tablet computers, accessories such as earbuds, electronic pencils (e.g., a stylus), or computer mice, other portable electronic devices, and/or other electronic equipment. In an illustrative configuration, which is sometimes described herein as an example, system 8 has a first electronic device 10A, a second electronic device 10B, and a third electronic device 10C. Electronic device 10A is a wireless power transmitting device such as a wireless charging mat. Device 10A has a housing such as housing 22A (e.g., a housing with a planar upper charging surface on which devices to be charged are placed). Electronic device 10C is a portable electronic device such as a cellular telephone and electronic device 10B is a battery case. Device 10B has a housing such as housing 22B with a recess R and/or other structures configured to receive housing 22C of device 10C. In this way, a user may removably attach device 10C to device so that devices 10B and 10C may be used together as a portable unit. Housing 22C may have planar front and rear faces (as an example). The front face, which faces upwardly in the orientation of FIG. 1, has a display. The rear face of housing 22C faces towards housing 22B of device 10B.

To provide device 10C with supplemental power while protecting device 10C from damage due to stress-producing events such as drop events, device 10B is installed on device 10C (e.g., housing 22C of device 10C is placed within corresponding recess R in housing 22B of device 10B). In this position, devices 10B and 10C may be carried in the pocket of a user (as an example). When it is desired to receive wireless power from device 10A, devices 10B and 10C may be placed together on the charging surface of device 10C.

Device 10A has one or more wireless power coils such as wireless power coil 12. Coils such as coil 12 are used for inductive wireless power transfer and may therefore sometimes be referred to as inductive power coils. When it is desired to transmit wireless power, an alternating current is applied to coil 12, which generates a corresponding alternating-current electromagnetic field. Wireless power that is transmitted in this way is received by corresponding nearby wireless power coils. As shown in FIG. 1, for example, device 10C has at least one wireless power coil such as coil 20 that can receive wireless power directly from coil 12 in the absence of device 10B. Device 10B has two wireless power coils such as coils 14 and 16.

During a bypass mode of operation, coils 14 and 16 are shorted together. While shorted together, alternating current electromagnetic signals that are transmitted by coil 12 are received by coil 14. Coil 16 is shorted to coil 14 in this mode of operation, so coil 16 emits electromagnetic signals that are received by coil 20 in device 10C. Electrical components such as battery 18 may be interposed between coils 14 and 16. In the absence of the shorting path between coils 14 and 16, wireless power signals may tend to be blocked by the presence of battery 18. When coils 14 and 16 are shorted together, however, the wireless power that is received by coil 14 is reemitted as transmitted wireless power signals by coil 16 for reception by coil 20. As a result, the shorting of coils 14 and 16 allows internal device components such as battery 18 to be effectively bypassed. This helps prevent components in device 10B such as battery 18 from blocking the transfer of power from device 10A to device 10B. As used herein, the shorting of coils 14 and 16 refers to the connection of a first lead from each of coils 14 and 16 together and a second lead from each of coils 14 and 16 together. One or more switches connected in series with coils 14 and 16 can selectively short the two coils. When shorted together, wireless power received by coil 14 induces a given current to flow through coil 14 that flows in series through coil 16 (e.g., an alternating-current signal flows in a loop through coils 14 and 16). In effect, shorting coils 14 and 16 together forms a unitary two-part coil structure. In the bypass mode, the first part of the two-part coil structure receives alternating-current electromagnetic fields and causes an alternating-current (AC) current to flow through the first and second parts in series. While the AC current is flowing through the second part, electromagnetic fields are emitted by the second part that are received by wireless power receiving device 10C.

Housing 22B of device 10B may have opposing planar surfaces. A first face of the housing of device 10B may face the upper charging surface of device 10A when device 10B is placed on device 10A for charging. The opposing second face of the housing of device 10B may face the lower surface of housing 22C when device 10C is attached to device 10B. Battery 18 may have a planar shape (as an example). As shown in FIG. 1, battery 18 lies between the opposing first and second faces of housing 22B of device 10B. Coil 14 is located between battery 18 and the first face of housing 22B (facing device 10A). Coil 16 is located between battery 18 and the second face of housing 22B (facing device 10C). In this embodiment, battery 18 is interposed between coils 14 and 16.

Figure 2:
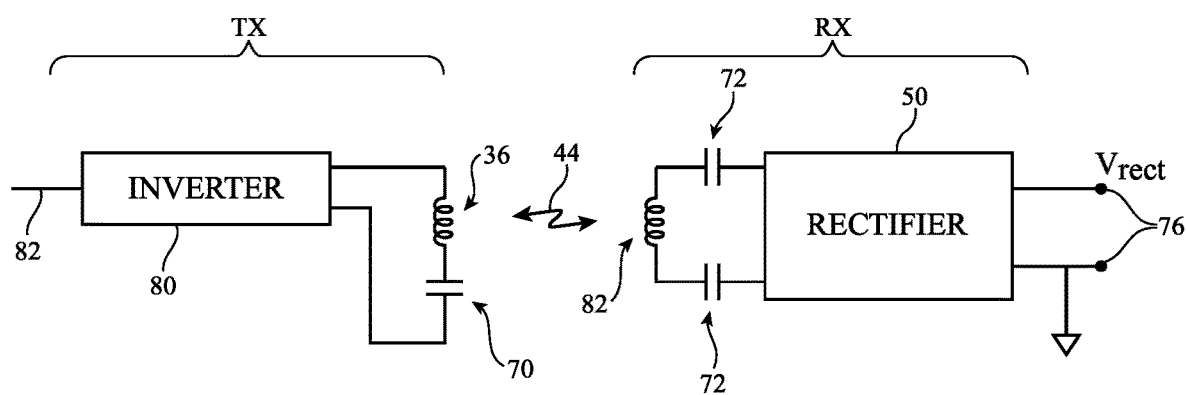
FIG. 2 is a circuit diagram of illustrative wireless power circuitry in accordance with an embodiment.

The devices 10 of FIG. 1 may transmit power and/or may receive wireless power. Illustrative wireless power circuitry of the type that may be used in devices 10 is shown in FIG. 2. The wireless power circuitry of FIG. 2 includes wireless power transmitter TX and wireless power receiver circuitry RX. During operation, wireless power signals 44 are transmitted by circuitry TX and received by circuitry RX. In the embodiment of FIG. 2, wireless power is transferred from coil 36 to coil 82 in a single direction. If desired, additional transmitter and receiver circuitry may be provided to allow wireless power to be transferred bidirectionally (e.g., to allow a first transmitter circuit to transmit power from coil 36 to coil 82 for reception by a first receiver circuit and to also allow a second transmitter circuit to transmit power from coil 82 to coil 36 for reception by a second receiver circuit). The unidirectional power transmission circuitry of FIG. 2 is illustrative.

As shown in FIG. 2, circuitry TX includes inverter circuitry 80. Control circuitry supplies control signals to inverter circuitry 80. Inverter circuitry 80 supplies corresponding alternating-current drive signals to coil 36. Circuit components such as capacitor 70 may be coupled in series with coil 36 as shown in FIG. 2. When alternating-current current signals are supplied to coil 36, corresponding alternating-current electromagnetic signals (wireless power signals 44) are transmitted to nearby coils such as illustrative coil 82 in receiver circuitry RX. This induces a corresponding alternating-current (AC) current signal in coil 82. Capacitors such as capacitors 72 may be coupled in series with coil 82. Rectifier 50 receives the AC current from coil 82 and produces corresponding direct-current power (e.g., direct-current voltage Vrect) at output terminals 76. This power may be used to power a load.

In a bidirectional wireless power system, wireless power transmitting circuitry such as inverter 80 and wireless power receiving circuitry such as receiver 50 may be coupled to a common coil. This allows the same coil to be used in receive wireless power (when the wireless power receiving circuitry is active) and in transmitting wireless power (when the wireless power transmitting circuitry is active). Arrangements in which a pair of coils (see, e.g., coils 14 and 16) are selectively coupled together with switching circuitry may also be used. The circuitry of FIG. 2 may be used in device 10A, 10B, and/or 10C (e.g., coils 36 and/or 82 may be implemented using coils such as coils 12, 14, 16, and/or 20 of FIG. 1).

Figure 3:
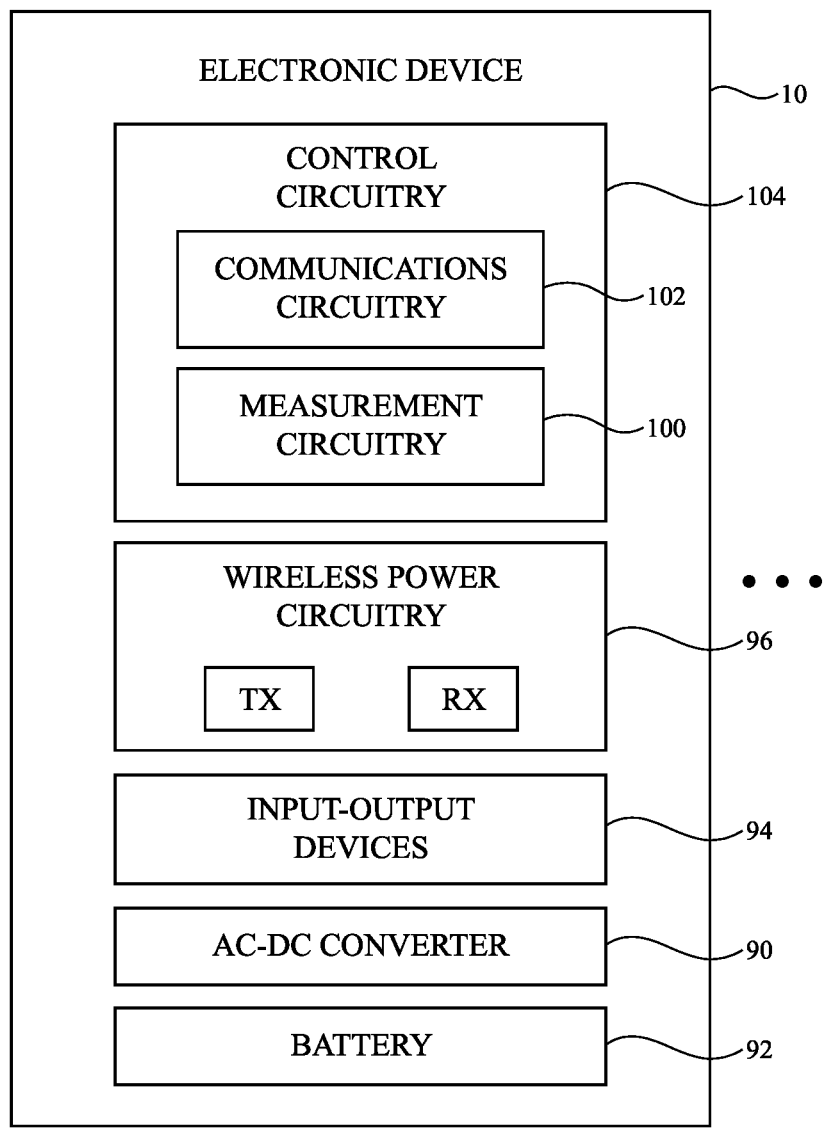
FIG. 3 is a schematic diagram of illustrative electronic device circuitry in accordance with an embodiment.

FIG. 3 is a schematic diagram showing illustrative circuitry that may be used in each device 10 in system 8. The circuitry of FIG. 3 need not all be used in a given device. For example, some of the circuitry of device 10 of FIG. 3 may be used in device 10A but not in devices 10B and 10C. Device 10A may, as an example, be a wireless charging mat that is coupled by a cable to a mains power supply (e.g., a wall outlet). In this arrangement, device 10A may use an alternating-current-to-direct-current power converter such as AC-DC converter 90 to convert alternating-current (AC) mains power to direct-current (DC) power for use by device 10A, whereas circuitry such as AC-DC converter 90 may be omitted from devices 10B and 10C. If desired, device 10A and/or devices 10B and 10C may include other types of power sources. For example, device 10A, device 10B, and/or device 10C may include batteries such as battery 92.

Devices 10A, 10B, and 10C may include wireless power circuitry 96 such as wireless power transmitter circuitry TX and/or wireless power receiver circuitry RX. For example, device 10A may contain only transmitter circuitry TX and no receiver circuitry RX. Device 10C may contain only receiver circuitry RX for receiving power from device 10A and/or from device 10B or, if desired, may contain both receiver circuitry RX (for receiving power from device 10A and/or device 10B) and transmitter circuitry TX (for transmitting power to an electronic device 10 such as a pair of earbuds, an electronic stylus, or other electronic device and/or for transmitting power to device 10B). Device 10B may contain circuitry RX (e.g., to receive power from device 10A to charge a battery in device 10B and, if desired, to receive power from device 10C) and may contain circuitry TX (e.g., to transmit power from the battery in device 10B to device 10C when devices 10B and 10C are coupled together and device 10C desires supplemental power from device 10B and/or to transmit power from the battery in device 10B to other electronic devices). Other configurations (e.g., configurations in which device 10A includes wireless power receiver circuitry RX, etc.) may also be used, if desired. Wireless power transmitter circuitry TX and wireless power receiver circuitry RX contain coils, as described in connection with coils 36 and 82 of FIG. 2.

Device 10A, device 10B, and device 10C include control circuitry as shown by control circuitry 104 of device 10 of FIG. 3. Control circuitry 104 is used to control the operation of devices 10A, 10B, and 10C. This control circuitry may include processing circuitry associated with microprocessors, power management units, baseband processors, digital signal processors, microcontrollers, and/or application-specific integrated circuits with processing circuits. The processing circuitry implements desired control and communications features in devices 10A, 10B, and 10C. For example, the processing circuitry may be used in selecting coils, determining power transmission levels, processing sensor data and other data, processing user input, handling negotiations between devices, sending and receiving in-band and out-of-band data, making measurements, and otherwise controlling the operation of system 8.

Control circuitry in system 8 such as control circuitry 104 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 104. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 104. The processing circuitry may include application-specific integrated circuits with processing circuitry, one or more microprocessors, a central processing unit (CPU) or other processing circuitry.

Electronic devices 10A, 10B, and 10C may include input-output circuitry as shown by input-output devices 94 of FIG. 3. Input-output devices 94 may include light-based devices (e.g., displays, status indicator lights formed from light-emitting diodes or other light emitters, ambient light sensors, image sensors, optical proximity sensors, three-dimensional image sensors formed from light emitters that project beams of light and corresponding image sensors that detect dots where the projected light beams strike objects, camera flash components, and/or other circuits that emit and/or detect light), radio-frequency circuitry (e.g., radio-frequency circuitry such as radar circuitry and/or other radio-frequency circuitry for detecting the location and movement of objects), acoustic components (e.g., microphones for gathering sound and speakers for emitting sound), haptic output devices for providing vibrations and other haptic output, touch sensors, buttons, force sensors, joysticks, knobs, temperature sensors, gas sensors, and/or other circuitry for detecting user input and for measuring environmental data.

Electronic devices 10A, 10B, and 10C may be any suitable electronic devices. For example, device 10A may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which device 10A is a wireless power transmitting device such as a wireless charging mat are sometimes described herein as an example. Electronic device 10B may be a supplemental battery pack. For example, device 10B may include a battery such as battery 92 to provide supplemental battery power to electronic devices such as device 10C and/or other electronic devices. Illustrative configurations in which device 10B is a battery case (sometimes referred to as a supplemental enclosure, removable case, or removable battery case) are sometimes described herein as an example. Electronic device 10C may be a cellular telephone or other portable electronic device (e.g., a tablet computer, laptop computer, wristwatch device, headphones, earbuds, stylus, or other electronic device). Illustrative configurations in which device 10C is a cellular telephone are sometimes described herein as an example.

Devices 10A, 10B, and/or 10C may include wireless communications circuitry such as communications circuitry 102 of device 10 of FIG. 3. The wireless communications circuitry may be used by devices 10A, 10B, and/or 10C to allow these devices (or a subset of these devices) to communicate wirelessly using in-band or out-of-band communications. Circuitry 102 may, for example, have wireless transceiver circuitry (e.g., a wireless transmitter) that wirelessly transmits out-of-band signals to an external device using an antenna. Circuitry 102 may also have wireless transceiver circuitry (e.g., a wireless receiver) that is used to wirelessly receive out-of-band signals from an external device using the antenna.

Wireless communications circuitry 102 can use one or more coils (e.g., coils in transmitter circuitry TX and/or receiver circuitry RX) to transmit and/or receive in-band signals. Any suitable modulation scheme may be used to support in-band communications between devices 10A, 10B, and/or 10C. With one illustrative configuration, frequency-shift keying (FSK) is used to convey in-band data from a power transmitting circuit to a power receiving circuit (e.g., the frequency of wireless power signals may be modulated when power is being transmitted from the power transmitting circuit to the power receiving circuit) and amplitude-shift keying (ASK) is used to convey in-band data from a wireless power receiving circuit to a wireless power transmitting circuit. Power may be conveyed wirelessly between devices during these FSK and ASK transmissions. Other types of in-band communications may be used, if desired.

During wireless power transmission operations, control circuitry 104 drives inverter circuitry in transmitter circuitry TX to supply AC drive signals to one or more coils at a given power transmission frequency. The power transmission frequency may be, for example, a predetermined frequency of about 125 kHz, at least 80 kHz, at least 100 kHz, less than 500 kHz, less than 300 kHz, or other suitable wireless power frequency. In some configurations, the power transmission frequency may be negotiated in communications between devices. In other configurations, the power transmission frequency may be fixed.

During wireless power transfer operations with a wireless power transmitting device (e.g., one of devices 10 in system 8), while power transmitter circuitry TX is driving AC signals into one or more of coils to produce wireless signals 44 at the power transmission frequency, communications circuitry 102 uses FSK modulation to modulate the power transmission frequency of the driving AC signals and thereby modulate the frequency of signals 44. In a wireless power receiving device (e.g., another of devices 10 in system 8), a coil is used to receive signals 44. Power receiver circuitry RX uses the received signals on the coil and the rectifier circuitry in circuitry RX to produce DC power. At the same time, wireless transceiver circuitry in the receiving device uses FSK demodulation to extract the transmitted in-band data from signals 44. This approach allows FSK data (e.g., FSK data packets) to be transmitted in-band between devices 10 with coils while power is simultaneously being wirelessly conveyed from between devices 10 using the coils.

In-band communications between devices 10 may also use ASK modulation and demodulation techniques. Wireless transceiver circuitry in a wireless power receiving device (e.g., one of devices 10) transmits in-band data to a wireless power transmitting device (e.g., another of devices 10) by using a switch (e.g., one or more transistors that are coupled to a wireless power receiver coil) to modulate the impedance of the power receiver circuitry RX of the wireless power receiving device. This, in turn, modulates the amplitude of signal 44 and the amplitude of the AC signal passing through the transmitting coil(s). Wireless transceiver circuitry in a wireless power transmitting device monitors the amplitude of the AC signal passing through the wireless power transmitting coil(s) and, using ASK demodulation, extracts the transmitted in-band data from these signals that was transmitted by wireless transceiver circuitry in the wireless communications circuitry of the wireless power receiving device. The use of ASK communications allows ASK data bits (e.g., ASK data packets) to be transmitted in-band from a power receiving device to a power transmitting device while power is simultaneously being wirelessly conveyed from the power transmitting device to the power receiving device.

If desired, control circuitry 104 of devices 10A, 10B, and/or 10C (e.g., device 10 of FIG. 3) may have external object measurement circuitry 100 (sometimes referred to as foreign object detection circuitry or external object detection circuitry) that detects external objects on a charging surface or other wireless power output region associated with device 10. Circuitry 100 can detect foreign objects such as coils, paper clips, and other metallic objects and can detect the presence of a wireless power receiving device in the vicinity of wireless power transmitting circuitry. During object detection and characterization operations, external object measurement circuitry 100 can be used to make measurements on coils in device 10 to determine whether any external electronic devices are present on or near device 10 (e.g., touching a surface of the housing of device 10).

In an illustrative arrangement, measurement circuitry 100 of control circuitry 104 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). The characteristics of the coil that receives a signal from measurement circuitry 100 depend on whether any foreign objects overlap that coil (e.g., coins, wireless power receiving devices, etc.) and also depend on whether a wireless power receiving device with a coil is present, which could increase the measured inductance of a coil. Signal measurement circuitry 100 is configured to apply signals to the coil and measure corresponding signal responses. For example, signal measurement circuitry 100 may apply an alternating-current probe signal while monitoring a resulting signal at a node coupled to the coil. As another example, signal measurement circuitry 100 may apply a pulse to the coil and measure a resulting impulse response (e.g., to measure coil inductance). Using measurements from measurement circuitry 100, device 10 can determine whether an external object is present on the coil(s) of device 10.

If desired, measurement circuitry 100 and/or other circuitry in device 10 of FIG. 3 may be omitted from one or more of devices 10A, 10B, and/or 10C to help reduce the cost and complexity of that device. For example, device 10A may have a battery to help store energy or battery 92 may be omitted from device 10A to reduce cost (e.g., in an embodiment in which device 10A has AC-DC power converter 90 to receive mains power). Converter 90 may, if desired, be omitted from devices 10B and 10C to conserve space and reduce cost and complexity for those devices. In an embodiment, measurement circuitry 100 is included in device 10A and is omitted from devices 10B and 10C. In an embodiment in which device 10C has wireless power transmitter circuitry TX, device 10C may include measurement circuitry 100. In an embodiment in which device 10C does not include wireless power transmitter circuitry TX, device 10C need not include measurement circuitry 100 (as an example).

Communications circuitry 102 may likewise be incorporated and/or omitted from one or more of devices 10A, 10B, and/or 10C. In some embodiments, a given one of devices 10A, 10B, and 10C includes only transmitter circuitry TX or only receiver circuitry RX. If desired, one or more of devices 10A, 10B, and/or 10C may include transmitter circuitry TX and receiver circuitry RX.

Figure 4:
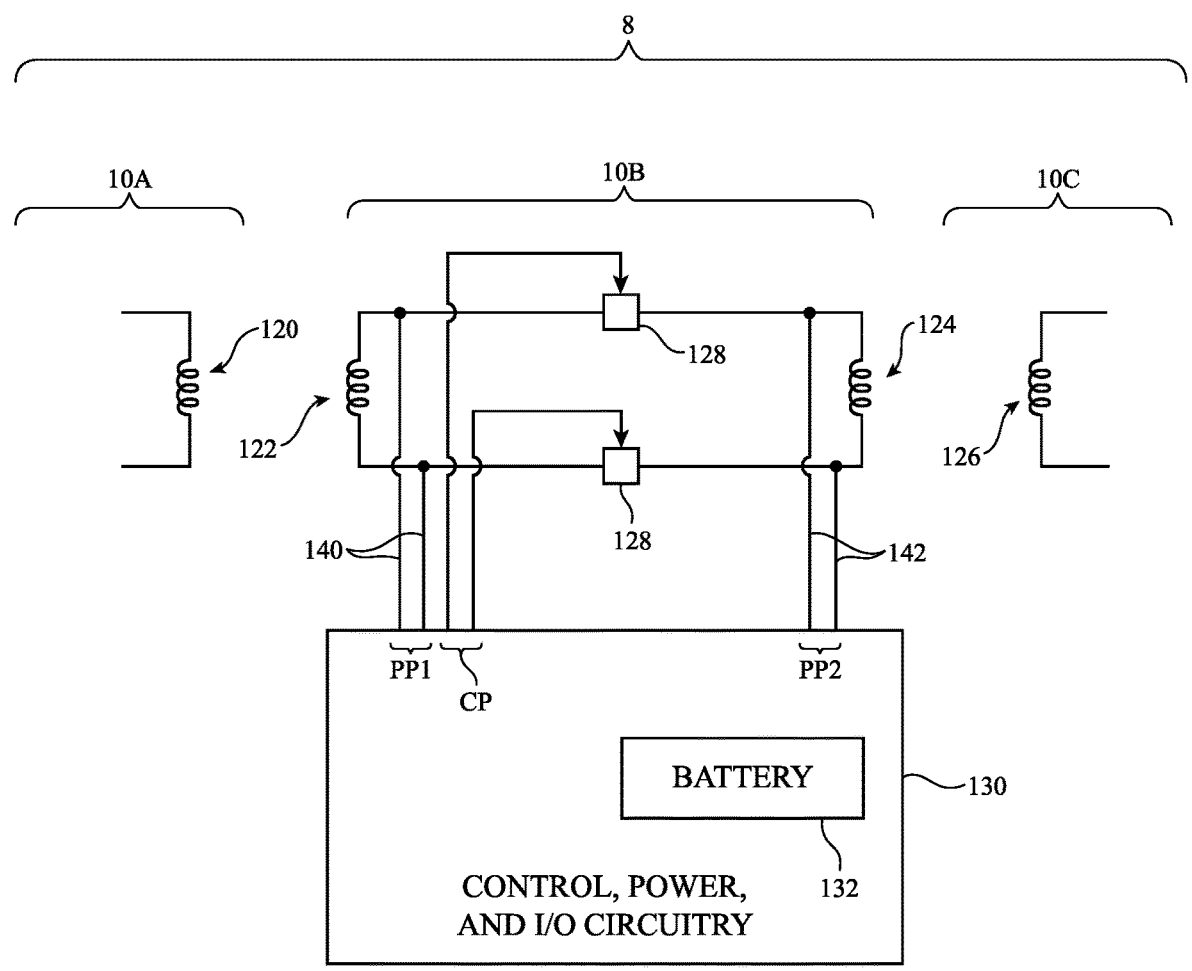
FIG. 4 is a circuit diagram of an illustrative wireless power system in accordance with an embodiment.

FIG. 4 is a circuit diagram showing how devices 10A, 10B, and 10C may be used together in system 8. In the embodiment illustrated in FIG. 4, devices 10A and 10B are electromagnetically coupled (e.g., coil 120 of device 10A is electromagnetically coupled with coil 122 of device 10B). Devices 10B and 10C are also electromagnetically coupled (e.g., coil 124 of device 10B is electromagnetically coupled with coil 126 of device 10C). In device 10A, wireless power circuitry such as wireless power circuitry 96 of FIG. 3 (e.g., wireless power transmitter circuitry TX) is coupled to coil 120 so that wireless power can be transmitted from coil 120 to device 10B. The transmitted power is received by coil 122. In device 10C, wireless power circuitry such as wireless power circuitry 96 of FIG. 3 (e.g., wireless power receiver circuitry RX and optionally wireless power transmitter circuitry TX) is coupled to coil 126. When it is desired to transmit wireless power from device 10B to device 10C, coil 124 may be used to transmit wireless signals to coil 126. A rectifier in wireless power receiver circuitry RX of device 10C rectifies the received signals and produces DC power for the components of device 10C. In embodiments in which device 10B is not present, wireless power can be transmitted from coil 120 of device 10A to coil 126 of device 10C. Optional wireless power transmitter circuitry in device 10C can also be used to transmit wireless power (e.g., to device 10B and/or other electronic devices such as earbuds and other accessories).

As shown in FIG. 4, device 10B has circuitry 130 (sometimes referred to as control circuitry or control and power circuitry). Circuitry 130 includes circuitry such as control circuitry (see, e.g., circuitry 104 of FIG. 3), power circuitry (see, e.g., wireless power circuitry 96 and battery 92 of FIG. 3), and optional input-output circuitry (see, e.g., input-output devices 94 of FIG. 3). During operation, control circuitry 130 supplies control signals to switching circuitry 128 formed from one or more switches. Switching circuitry 128 is coupled between coils 122 and 124. Switching circuitry 128 may include, for example, a first switch that is interposed between a first terminal of coil 122 and a first terminal of coil 124 and a second switch that is interposed between a second terminal of coil 122 and a second terminal of coil 124. This arrangement allows a full-bridge rectifier topology to be used for the rectifier circuitry of circuitry 130. If desired, the second switch may be omitted (e.g., the second terminal of coil 122 may be shorted to the second terminal of coil 124).

Switching circuitry 128 is controlled by control signals that circuitry 130 supplies to switching circuitry 128 via control port CP. Circuitry 130 also has port PP1 and signal lines 140 that couple port PP1 to coil 122 and port PP2 and signal lines 142 that couple port PP2 to coil 124.

Figure 5:
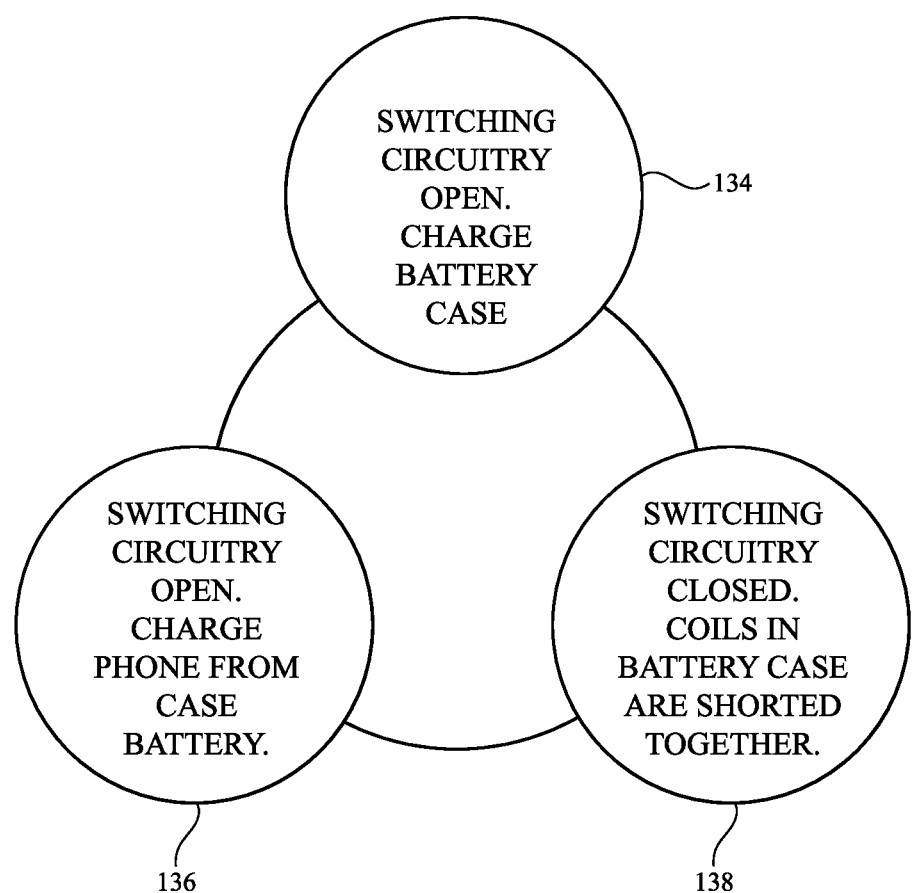
FIG. 5 is a diagram of illustrative operations involved in using a wireless power system in accordance with an embodiment.

Illustrative modes of operation for system 8 of FIG. 4 are shown in FIG. 5. The control circuitry of system 8 is used in determining when to transition between the modes of operation of FIG. 5. For example, control circuitry in device 10B may determine when to open and close switching circuitry 128 and make other changes to the operation of device 10B by monitoring whether device 10B is coupled to device 10C and/or when device 10B is coupled to device 10A. In an embodiment, device 10B uses measurement circuitry 100 and optionally communications circuitry such as in-band communications circuitry or other circuitry to determine when the coils of device 10B are electromagnetically coupled to coils in other devices. In the event that device 10B detects a nearby device (e.g., device 10C), device 10B and device 10C can communicate to determine whether power should be wirelessly transmitted from device 10B to device 10C, etc. Device 10B can independently communicate with device 10A and with device 10C to determine a satisfactory mode of operation and/or can monitor communications between device 10A and device 10C. If device 10B is removed from device 10A (e.g., as detected by measurement circuitry 100 in device 10A, device 10B, and/or 10C and/or communications circuitry), a reset operation may be performed (e.g., so that device 10B can establish a communications link such as an in-band communications link with device 10C).

During the operations of mode 134, switching circuitry 128 is placed in an open state, thereby electrically isolating coils 122 and 124. In this mode, any current flowing in coil 122 does not flow through coil 124 and any current flowing in coil 124 does not flow through coil 124. With coil 122 isolated from coil 124, coil 122 can receive wireless power from coil 120 that is passed to rectifier circuitry in circuitry 130 via lines 140 and port PP1 and/or coil 124 can optionally receive wireless power from coil 126 that is passed to rectifier circuitry in circuitry 130 via lines 142 and port PP2. In an embodiment, device 10A (e.g., a charging mat) supplies device 10B (e.g., a battery case) with wireless power that is received using coil 122 and circuitry 130 and that is used to charge battery 132 (e.g., a supplemental battery mounted in the housing of the battery case).

During the operations of mode 136, device 10B (e.g., a battery case) is not receiving wireless power from device 10A (e.g., a charging mat) and device 10A need not be present (e.g., device 10B and a cellular telephone or other device 10C may be coupled together and may be carried in a user's pocket or may be otherwise located far from device 10A). In this mode, device 10B (e.g., the battery case) can use the stored energy in battery 132 to wirelessly charge device 10C (e.g., the cellular telephone that is attached to device 10B). During these operations, switching circuitry 128 is placed in an open state and wireless power is transmitted by wireless power transmitter circuitry TX in circuitry 130 and coil 124. This wirelessly transmitted power is received by coil 126 and wireless power receiver circuitry RX that is coupled to coil 126 in device 10C.

In some situations, device 10C is physically coupled to device 10B (e.g., a cellular telephone is installed in a battery case) and the telephone and case are resting on the charging surface of device 10A (e.g., a charging mat). To efficiently provide power to device 10C from device 10A in this scenario, system 8 is operated in mode 138. During the operations of mode 138, which may sometimes be referred to as a pass-through mode or bypass mode, control circuitry in circuitry 130 of device 10B places switching circuitry 128 in a closed state (e.g., the first and second switches of circuitry 128 are both closed, so that the first terminal of coil 122 is shorted to the first terminal of coil 124 and so that the second terminal of coil 122 is shorted to the second terminal of coil 124). With coils 122 and 124 shorted together in this way, current flows through coils 122 and 124 in series (e.g., the same current that is flowing through coil 122 also flows through coil 124).

During mode 138, as wireless power is transmitted from coil 120 to coil 122, a corresponding alternating current is induced in coil 122. This alternating current flows through coil 124 because coil 124 is shorted to coil 122. When the alternating current that is flowing through coil 122 flows through coil 124, electromagnetic signals (e.g., wireless power) is transmitted from coil 124 to coil 126 and received by the wireless power receiver circuitry RX of device 10C.

As illustrated by coils 14 and 16 on opposing sides of battery 18 in the example of FIG. 1, coils 122 and 124 of FIG. 4 may be placed on opposing sides of battery 132. This arrangement facilitates electromagnetic coupling between coil 120 of device 10A and coil 122 of device 10B and facilitates electromagnetic coupling between coil 124 of device 10B and coil 126 of device 10C. As a result, power that is transmitted by device 10A is efficiently conveyed to device 10C bypassing battery 132 and intermediate AC-DC conversion steps in device.

If desired, system 8 may be operated in reverse while switching circuitry 128 is in its closed state. For example, device 10C may use a wireless power transmitter to transmit power from coil 126 to coil 124 while coils 122 and 124 are shorted together and a coil in an accessory or other device with a coil such as coil 120 may receive corresponding wireless power transmitted from coil 122. This arrangement allows energy to be transferred from device 10C to device 10A or to another electronic device such as earbuds, an electronic stylus, headphones, and/or a computer mouse.

In an embodiment, circuitry 130 does not rectify or otherwise tap into the wireless power that is received by coil 122 or coil 124 when switching circuitry 128 is closed. In another embodiment, rectifier circuitry in circuitry 130 taps a portion of the power received by coil 122 (e.g., a portion of this received power is converted to DC power for use by circuitry 130 while power is being transferred from device 10A to device 10C in the bypass mode). Circuitry 130 may, for example, tap a portion of the receive power to use in charging battery 132 and/or to supply input-output circuitry or other load circuitry with power while device 10A is supplying wireless power to device 10C (e.g., to charge a battery in device 10C).

The communications circuitry of device 10B (e.g., FSK and/or ASK decoder circuitry or other in-band and/or out-of-band communications circuitry) can allow devices 10A and 10C to communicate without taking action (e.g., so that device 10C can provide device 10A with control signals to dynamically adjust the amount of power that device 10A transmits to device 10C while circuitry 128 is closed). For example, devices 10A and 10C can communicate directly using in-band communications such as ASK and/or FSK communications whenever switching circuitry 128 is in its closed state to allow signals to pass through the combined coil formed by joining coils 124 and 122 in series through switching circuitry 128.

In an embodiment, the communications circuitry of device 10B monitors communications traffic between device 10A and device 10C or otherwise communicates with devices 10A and/or 10C. Device 10B may, as an example, gather information on the status of system 8 by monitoring communications between devices 10A and 10C and/or by querying device 10A and/or 10C for information. This information may include, for example, charge status information, information on whether device 10A is transmitting a reduced amount of power to ensure that operating temperature limits or other constraints are satisfied, whether a potential fault is present or is not present, whether power is being transmitted or is not being transmitted, the amount of charge of one or more of the batteries in system 8 (e.g., low, medium, or high), and/or other information on the operational state of system 8. This information may be presented to a user of system 8 using input-output devices in device 10A, device 10B, and/or device 10C.

In an embodiment, device 10B has input-output devices (status indicator lights such as light-emitting diodes, a display, a speaker, a vibrator or other haptic output device, other output components, etc.) and these input-output devices supply status information to the user. The status information may be provided as visual status information (e.g., a battery charge state or wireless charging status indicated by light-emitting diodes or other visual output device), as audible output (e.g., tones indicating whether system 8 is charging or batteries are fully or partially charged), as haptic output (e.g., a vibration indicating that battery charging has commenced or ceased, etc.), and/or may be provided as other suitable output to convey information on the operation of system 8 to the user.

The foregoing describes a wireless charging technology that uses in-band communications (e.g., ASK) to provide information such as states of charge, charging speeds, and so forth, to control power transfer. It is not necessary for personal information to be transmitted in order for embodiments of the present technology to operate. However, because communications technologies such as ASK communicate bitwise information, it is technically possible for implementers of the present technology to communicate information beyond that which is needed to carry out wireless power transmission.

To the extent that the present technology is leveraged to transmit information that may implicate privacy concerns, hardware and/or software elements can be provided for users to selectively block the use of, or access to, personal information data. For example, a user may be notified upon placement of their phone on a wireless charging mat that their personal information data will be accessed if they continue with the wireless charging session.

It is well understood that the use of personally identifiable information should follow privacy policies and practices that are generally recognized as meeting or exceeding industry or governmental requirements for maintaining the privacy of users.

Personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. A battery case that is operable in a system having a wireless power transmitting device and having a wireless power receiving device that is removably attached to the battery case, comprising:
   a battery;
   a first coil;
   a second coil;
   switching circuitry configured to couple and decouple the first and second coils; and
   control circuitry configured to selectively place the switching circuitry in (1) an open state and (2) a closed state, wherein
      in the closed state, the first and second coils are shorted together, power is received wirelessly by the first coil from the wireless power transmitting device and induces a given current to flow through the first coil and causes the given current to flow through the second coil, and the second coil provides the power wirelessly to the wireless power receiving device, and
      in the open state, the first and second coils are not shorted together and power is received wirelessly by the first coil from the wireless power transmitting device to charge the battery.

2. The battery case of claim 1, wherein the control circuitry is configured to place the switching circuitry in the open state while using the second coil to wirelessly transmit power from the battery to the wireless power receiving device.

3. The battery case of claim 2, wherein the control circuitry is configured to place the switching circuitry in the open state while using the second coil to wirelessly receive power from the wireless power receiving device to charge the battery.

4. The battery case of claim 1, wherein the control circuitry is configured to place the switching circuitry in the open state while using the second coil to wirelessly receive power from the wireless power receiving device to charge the battery.

5. The battery case of claim 1 wherein while the switching circuitry is in the open state, the control circuitry is configured to operate in:
   a first mode in which the control circuitry uses the first coil to wirelessly receive power; and
   a second mode in which the control circuitry uses the second coil to wirelessly transmit power.

6. The battery case of claim 1, wherein the first coil has first and second terminals, the second coil has first and second terminals, and the switching circuitry comprises:

a first switch with a first terminal connected to the first terminal of the first coil and a second terminal connected to the first terminal of the second coil.

7. The battery case of claim 6, wherein the switching circuitry further comprises:
a second switch with a first terminal connected to the second terminal of the first coil and a second terminal connected to the second terminal of the second coil.

8. The battery case of claim 1 wherein, in the closed state, the switching circuitry shorts a first terminal of the first coil to a first terminal of the second coil and shorts a second terminal of the first coil to a second terminal of the second coil so that the given current flows in series through the first and second coils.

9. The battery case of claim 1 further comprising:
a housing that surrounds the battery, wherein the first coil is located in the housing on a first side of the battery and the second coil is located in the housing on an opposing second side of the battery.

10. The battery case of claim 9 wherein the wireless power receiving device comprises a cellular telephone and wherein the housing is configured to receive the cellular telephone.

11. The battery case of claim 10 wherein the second coil is interposed between the battery and the cellular telephone when the cellular telephone is received within the housing.

12. The battery case of claim 1 wherein the battery is interposed between the first coil and the second coil.

13. The battery case of claim 1 wherein the control circuitry is configured to place the switching circuitry in the open state to prevent current from flowing through the first and second coils in series.

14. A method of operating a battery case having a battery, a first coil, a second coil, and switches configured to couple and decouple the first and second coils, the method comprising:
in a first mode of operation, closing the switches to short the first coil to the second coil;
during the first mode of operation while the switches are closed, using the first coil to receive wireless power from a wireless power transmitting device to induce a given current to flow through the first coil and cause the given current to flow through the second coil to provide wireless power, using the second coil, to a wireless power receiving device;
in a second mode of operation, opening the switches so that the first coil is not shorted to the second coil; and
during the second mode of operation while the switches are open, using the first coil to receive wireless power from the wireless power transmitting device to charge the battery.

15. The method of claim 14, further comprising:
in a third mode of operation, opening the switches to decouple the first coil from the second coil; and during the third mode operation while the switches are open, using the second coil to transmit wireless power from the battery to the wireless power receiving device.

16. The method of claim 15, further comprising:
in a fourth mode of operation, opening the switches to decouple the first coil from the second coil; and
during the fourth mode operation while the switches are open, using the second coil to receive wireless power from the wireless power receiving device to charge the battery.

17. The method of claim 14, further comprising:
in a fourth mode of operation, opening the switches to decouple the first coil from the second coil; and
during the fourth mode operation while the switches are open, using the second coil to receive wireless power from the wireless power receiving device to charge the battery.

18. A non-transitory computer-readable storage medium storing one or more programs configured to be executed by one or more processors of an electronic device operable in a wireless charging system with an additional electronic device and a power transmitting device, wherein the electronic device comprises a battery, a first coil, a second coil, and switches configured to selectively couple and decouple the first and second coils, the one or more programs including instructions for:
closing the switches to short the first coil to the second coil;
while the switches are closed, receiving wireless power, using the first coil, from the power transmitting device to induce a given current to flow through the first coil and cause the given current to flow through the second coil to provide wireless power, using the second coil, to the additional electronic device;
opening the switches to decouple the first coil from the second coil; and
while the switches are open, receiving wireless power, using the first coil, from the power transmitting device to charge the battery.

19. The non-transitory computer-readable storage medium of claim 18, wherein the one or more programs further include instructions for:
while the switches are open, transmitting wireless power, using the second coil, from the battery to the additional electronic device.

20. The non-transitory computer-readable storage medium of claim 18, wherein the one or more programs further include instructions for:
while the switches are open, receiving wireless power, using the second coil, from the additional electronic device to charge the battery.

* * * * *